(12) United States Patent
Xiao et al.

(10) Patent No.: US 10,234,963 B2
(45) Date of Patent: Mar. 19, 2019

(54) TOUCH PEN APPARATUS, SYSTEM, AND METHOD

(71) Applicant: LENOVO (Singapore) PTE. LTD., New Tech Park (SG)

(72) Inventors: Limin Xiao, Yokohama (JP); Qian Wang, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/066,991

(22) Filed: Mar. 10, 2016

(65) Prior Publication Data

US 2016/0266667 A1 Sep. 15, 2016

(30) Foreign Application Priority Data

Mar. 10, 2015 (JP) ................................. 2015-047712

(51) Int. Cl.
*G06F 3/033* (2013.01)
*G06F 3/0354* (2013.01)
*G06F 3/044* (2006.01)

(52) U.S. Cl.
CPC .......... *G06F 3/03545* (2013.01); *G06F 3/044* (2013.01); *G06F 2203/04808* (2013.01)

(58) Field of Classification Search
CPC ............................. G06F 3/03545; G06F 3/044
USPC ........................................ 345/179; 178/19.01
See application file for complete search history.

(56) References Cited

U.S. PATENT DOCUMENTS

| 6,624,832 | B1* | 9/2003 | Thomas | G06F 3/0481 345/173 |
| 9,213,424 | B1* | 12/2015 | Dunn | G06F 3/044 |
| 2004/0041799 | A1* | 3/2004 | Vincent | G06F 3/03545 345/179 |
| 2011/0102362 | A1* | 5/2011 | Fang | G02F 1/15 345/174 |
| 2011/0175599 | A1* | 7/2011 | Liu | G06F 3/03545 324/207.17 |
| 2012/0194457 | A1* | 8/2012 | Cannon | G06F 3/011 345/173 |
| 2013/0033437 | A1* | 2/2013 | Lee | G06F 3/03545 345/173 |
| 2013/0044078 | A1* | 2/2013 | Hallenberg | G06F 3/03545 345/174 |

(Continued)

FOREIGN PATENT DOCUMENTS

JP 07160399 6/1995
JP 07200133 A 8/1995

(Continued)

*Primary Examiner* — Adam J Snyder
(74) *Attorney, Agent, or Firm* — Kunzler, PC

(57) ABSTRACT

Provided are a touch pen and a touch pen system with a compact and low-cost configuration when an erase function is installed therein. The touch pen system includes a capacitive touch panel; a touch pen having a pen tip for specifying an arbitrary position on the touch panel and a pen rear end portion formed with a predetermined conductive pattern; predetermined pattern detection mechanism that detects contact of the predetermined conductive pattern with the touch panel; and an erase implementation mechanism that implements an erase function when the predetermined conductive pattern is detected.

20 Claims, 9 Drawing Sheets

(56) References Cited

U.S. PATENT DOCUMENTS

| | | | |
|---|---|---|---|
| 2014/0002422 A1* | 1/2014 | Stern | G06F 3/03545 345/179 |
| 2014/0258901 A1* | 9/2014 | Cho | G06F 3/03545 715/765 |
| 2014/0306929 A1* | 10/2014 | Huang | G06F 3/03545 345/174 |
| 2015/0212600 A1* | 7/2015 | Zerayohannes | G06F 3/03545 345/179 |
| 2015/0331539 A1* | 11/2015 | Chung | G06F 3/03545 345/173 |

FOREIGN PATENT DOCUMENTS

| | | |
|---|---|---|
| JP | 2007249670 A | 9/2007 |
| JP | 2008276803 | 11/2008 |
| JP | 2013054562 | 3/2013 |
| JP | 2013186869 A | 9/2013 |
| JP | 2014095978 | 5/2014 |
| JP | 2014206933 | 10/2014 |

\* cited by examiner

TOUCH PEN APPARATUS, SYSTEM, AND METHOD

The subject matter disclosed herein relates to a touch pen system and a touch pen.

BACKGROUND

Touch panels are used in various fields such as portable computing devices (tablet, laptop PC, smartphone, cellular phone, PDA, etc.), digital audio players, portable game machines, car navigation devices, copiers, ATMs of financial institutions, and automatic ticket vending machines at stations and restaurants. Such a touch panel is operated by touching or pressing a desired position of a display surface, on which an image is displayed, with a finger or a dedicated pen called a touch pen, a stylus, or the like (hereinafter referred to as a "touch pen").

There are available a resistive film touch panel, a surface acoustic wave touch panel, an infrared touch panel, an electromagnetic induction touch panel, a capacitive touch panel, and so on. Herein, in the capacitive touch panel, an input position on a display is detected by sensing a change in capacitance between a fingertip or a pen tip and a conductive film.

A touch pen for use with such a capacitive touch panel may be a passive pen or an active pen. In general, the passive pen mainly includes a pen holder and a pen tip made of a soft material such as a conductive rubber and attached to the tip of the pen holder.

On the other hand, the active pen mainly includes a pen holder, a pen tip attached to the tip of the pen holder, and an electric circuit provided in the pen holder and configured to generate an electric field from the pen tip. In the case of the active pen, since the electric field is generated from the pen tip, the position detection accuracy of the touch panel is relatively high so that the pen tip can be made thinner.

Recently, there has also been proposed a touch pen equipped with an erase function. When the erase function is installed in a rear end portion of the touch pen, and the rear end portion is of an active type, an electric circuit for the erase function is generally causing the touch pen to increase in both length and cost.

SUMMARY

The present embodiments include a method, apparatus, and touch pen system including in certain embodiments: a capacitive touch panel; a touch pen having a pen tip for specifying an arbitrary position on the touch panel and a pen rear end portion formed with a predetermined conductive pattern; predetermined pattern detection mechanism that configured detects contact of the predetermined conductive pattern with the touch panel; and erase function implementation mechanism that implements an erase function when the predetermined conductive pattern is detected.

According to one embodiment, the predetermined conductive pattern is preferably a plurality of conductive patterns spaced apart from each other by a predetermined distance.

According to one embodiment, assuming that the predetermined distance is L and that an interval between electrodes of the touch panel is P, it is preferable that the predetermined distance $L \geq 2P$.

According to one embodiment, it is preferable that the pen rear end portion have an inclined end face and that the predetermined conductive pattern be formed on the inclined end face.

According to one embodiment, the erase function implementation mechanism preferably implements the erase function when it is detected that the plurality of conductive patterns are moved by a predetermined distance while maintaining the predetermined distance between the plurality of conductive patterns.

In order to solve the above-mentioned problem and to achieve the above-mentioned object, the present embodiments include a touch pen for use with a capacitive touch panel, the touch pen including: a pen tip for specifying an arbitrary position on the touch panel; and a pen rear end portion formed with a predetermined conductive pattern.

According to one embodiment, the predetermined conductive pattern is preferably a plurality of conductive patterns spaced apart from each other by a predetermined distance.

According to one embodiment, assuming that the predetermined distance is L and that an interval between electrodes of the touch panel is P, it is preferable that the predetermined distance $L \geq 2P$.

According to one embodiment, it is preferable that the pen rear end portion have an inclined end face and that the predetermined conductive pattern be formed on the inclined end face.

According to one embodiment, an effect is obtained that it is possible to provide a touch pen system that can constitute a touch pen with a compact and low-cost configuration when an erase function is installed therein, and to provide such a touch pen

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
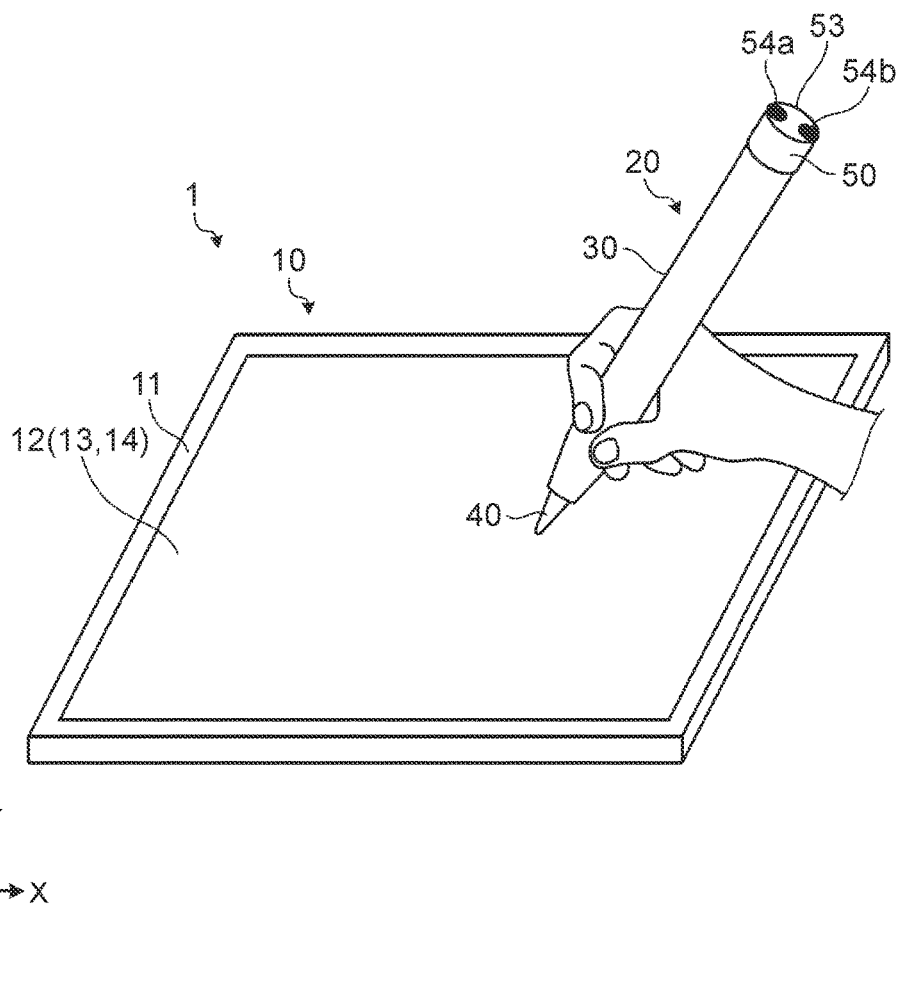
FIG. 1 is a perspective view showing a schematic configuration of a touch pen system according to this embodiment (in a state where a pen tip of a touch pen is used)

A touch pen system and a touch pen in certain embodiments are described herein by way of example. While components of the present embodiments are generally shown in the drawings of this specification, it can be easily understood that those may be widely and diversely disposed and designed in various configurations. Therefore, the following more detailed description of the embodiment of the touch pen system and the touch pen of the present embodiments do not limit the scope of the present described in the claims of this specification, but only shows one example of the embodiment described herein, i.e. merely shows selected embodiments of a device/configuration/structure described in the claims of this specification. Those skilled in the art can understand that the claimed embodiments can be realized even if one or more specific items are missing, or can be realized even by other methods, parts, or materials.

Figure 2:
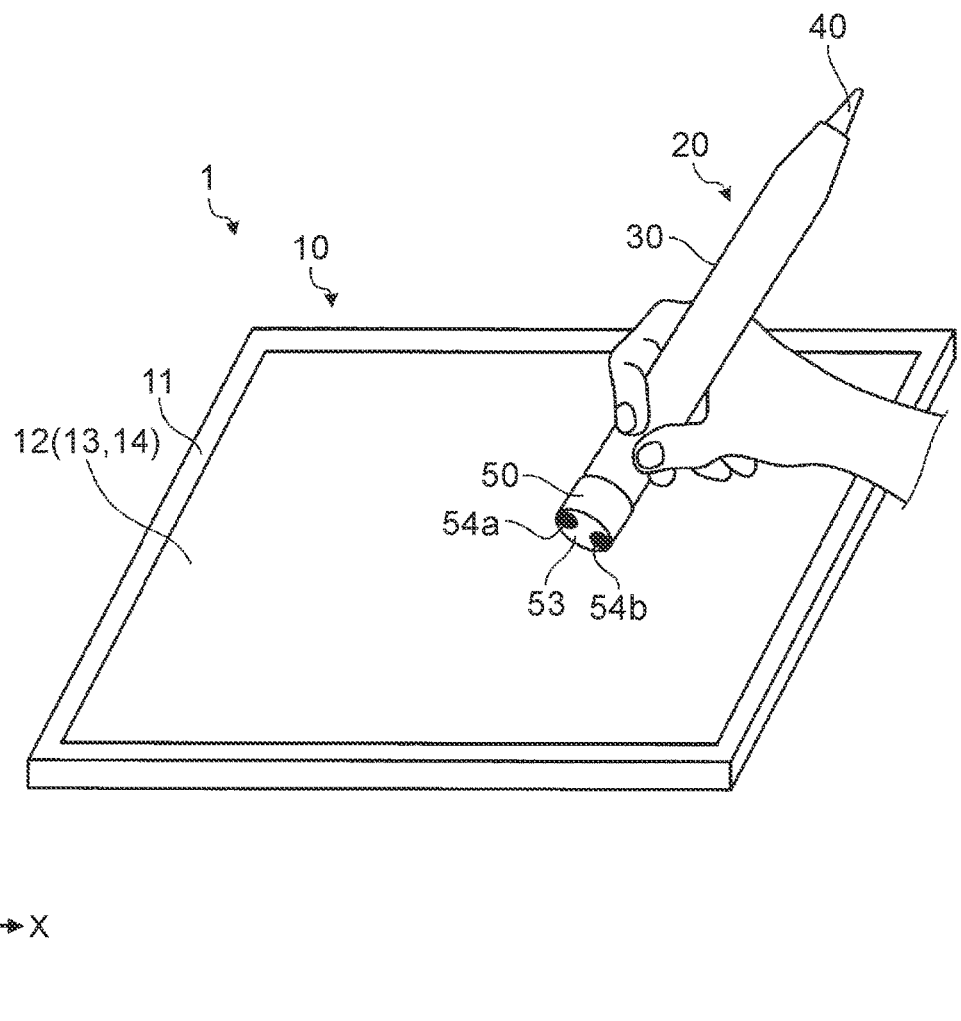
FIG. 2 is a perspective view showing the schematic configuration of the touch pen system according to this embodiment (in a state where a pen rear end portion (eraser) of the touch pen is used)
Figure 3:
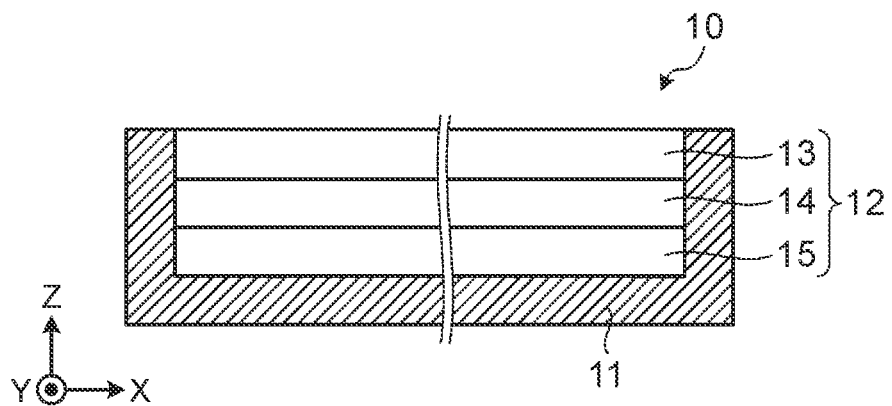
FIG. 3 is a schematic sectional view of a tablet computer.
Figure 4:
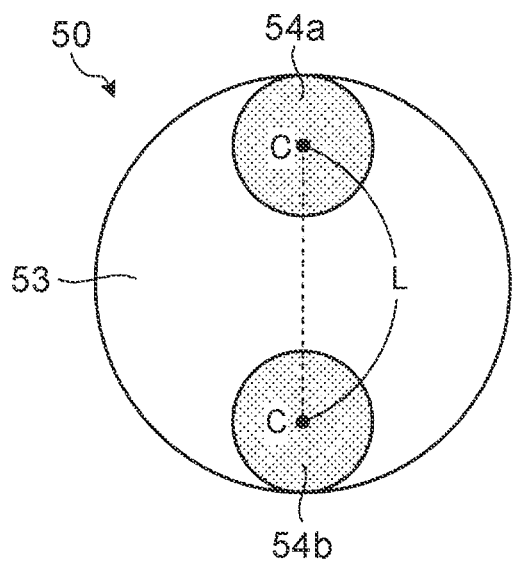
FIG. 4 is a schematic plan view of an end face of the pen rear end portion of the touch pen.

FIGS. 1 and 2 are perspective views showing a schematic configuration of a touch pen system according to this embodiment, wherein FIG. 1 shows a state where a pen tip of a touch pen is used, while FIG. 2 shows a state where a pen rear end portion (eraser) of the touch pen is used. FIG. 3 is a schematic sectional view of a tablet computer shown in FIG. 1, and FIG. 4 is a schematic plan view of an end face of the pen rear end portion of the touch pen.

As shown in FIGS. 1 and 2, a touch pen system 1 includes a tablet computer 10 and a touch pen 20 for implementing coordinate input and erasing in the tablet computer 10. The touch pen system 1 according to this embodiment is configured to be able to recognize a pen input by an active pen tip of the touch pen 20, a finger input (passive type) by a finger, and an erase input (passive type) by a pen rear end portion of the touch pen 20 and thus to be able to distinguish them from each other.

As shown in FIGS. 1 to 3, a touch panel 12 including a display portion 14 and a touch sensor 13 placed on the display portion 14 is disposed on the front side of the tablet computer 10. The tablet computer 10 includes a generally rectangular parallelepiped chassis 11 in which a board 15 mounting thereon various electronic components such as circuits for controlling display and coordinate detection of the touch panel 12, the display portion 14, and the touch sensor 13 are housed. The chassis 11 can be made of, for example, a synthetic resin or a metal. The touch sensor 13 is disposed so as to be substantially flush with a frame of the chassis 11.

The touch pen 20 is a pen having a pen tip of the active type and having an eraser of the passive type at its rear end. The touch pen 20 includes a pen body 30, a pen tip 40 attached to the pen body 30, and a cap-shaped pen rear end portion 50 attached to the pen body 30. For example, the pen tip 40 can be formed by a metal core with its surface made of a soft material such as, without limitation, felt. The touch pen 20 is configured to be able to implement coordinate input using the pen tip 40.

As shown in FIGS. 1, 2, and 4, the pen rear end portion 50 has a generally circular end face 53 formed with two conductive patterns 54a, 54b. The two conductive patterns 54a, 54b each have a generally circular shape and respectively have the center positions C or the positions C of center of gravity which are spaced apart from each other by a predetermined distance L. The pen rear end portion 50 is configured to be replaceable with respect to the pen body 30.

The touch pen 20 is configured to be able to implement erasing using the pen rear end portion 50.

The touch sensor 13 is a capacitive touch sensor and is configured to be able to implement multipoint detection and surface detection of a pointer. The touch sensor 13 is configured to be able to implement an erase function jointly with the pen rear end portion 50 of the touch pen 20. The touch sensor 13 includes a plurality of transparent X electrodes and a plurality of transparent Y electrodes arranged in X and Y directions in a matrix so that coordinate input using the pointer such as the finger or the touch pen 20 is enabled by detecting a change in capacitance due to the finger or the like or a change in capacitance due to an AC electric field at a predetermined frequency generated by the pen tip 40 of the touch pen 20. Further, the touch sensor 13 is configured to be able to implement the erase function jointly with the pen rear end portion 50 of the touch pen 20 by detecting the conductive patterns 54a, 54b formed on the end face 53 of the pen rear end portion 50 of the touch pen 20.

Figure 5:
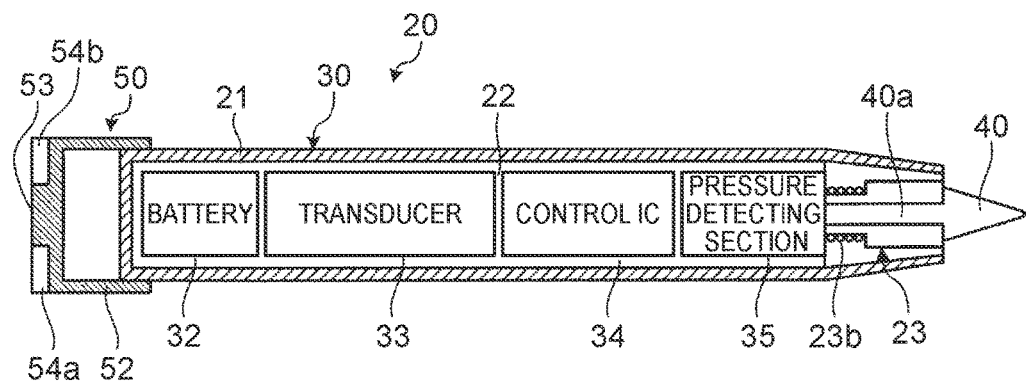
FIG. 5 is an exemplary sectional view of the touch pen.

FIG. 5 is an exemplary sectional view of the touch pen 20 shown in FIG. 1. As shown in FIG. 5, the pen body 30 of the touch pen 20 includes a pen body portion 21 as a hollow cylinder and a board 22 housed in the pen body portion 21. The pen body portion 21 is provided with a power switch 31. The pen body portion 21 is made of a material such as a conductive resin and formed in size and shape suitable for a user to hold it by hand and operate it.

The board 22 is mounted with a holder 23 holding the pen tip 40 so as to be slidable, a battery 32, a transducer 33, a control IC 34, and a pressure detecting section 35. The holder 23 is inserted with an insertion portion 40a of the pen tip 40 and has a spring 23b biasing the pen tip 40 outward. The pen tip 40 may be configured to be replaceable with respect to the holder 23.

The pressure detecting section 35 detects a pressure when the pen tip 40 is pressed against the touch sensor 13 so that the pen tip 40 is, by its pressing force, depressed against an elastic force of the spring 23b, and outputs the detected pressure to the control IC 34. While it is described that the depression of the pen tip 40 is detected by the pressure detecting section 35, the configuration is not limited thereto and another known detection method may alternatively be used.

The battery 32 is, for example, a lithium-ion battery or an alkali-ion battery. Power is supplied from the battery 32 to the control IC 34 so that the control IC 34 adjusts the voltage level and supplies voltages to the transducer 33 and the pressure detecting section 35. When the voltage is supplied, the transducer 33 starts oscillation to generate a sinusoidal signal so that the touch pen 20 is used as an active touch pen.

The transducer 33 is, for example, a voltage-controlled oscillator and is electrically connected to the metal core of the pen tip 40. The transducer 33 generates a sinusoidal signal (frequency f1, amplitude A1) based on the voltage output from the control IC 34 and transmits the sinusoidal signal via the metal core of the pen tip 40 so that a drive detecting section 105 (see FIG. 6) receives this sinusoidal signal via the touch sensor 13.

When depression of the pen tip 40 is detected based on a pressure detection result of the pressure detecting section 35, the control IC 34 changes the voltage that is output to the transducer 33, thereby causing the transducer 33 to generate a sinusoidal signal (frequency f2 (f2>f1), amplitude A1).

For example, the touch pen 20 may be configured to be set to an active state when a pressure is detected by the pressure detecting section 35, and to be shifted to a sleep state when the touch pen 20 is not used for a predetermined time.

On the other hand, the pen rear end portion 50 in certain embodiments includes a cap portion 52 fitted around the pen body portion 21 and configured to be attachable and detachable and the two conductive patterns 54a, 54b formed on the circular end face 53 of the cap portion 52. A side surface of the cap portion 52 can be made of, for example, a conductive resin, while the end face 53 of the cap portion 52 can be made of, for example, an insulating material. Although the pen rear end portion 50 is fitted around the pen body portion 21 in the example shown in FIG. 5, the pen rear end portion 50 may be fitted into the pen body portion 21. In order to enable the conductive patterns 54a, 54b to be detected by the touch panel 12, for example, when a user holds the pen body 30, the conductive patterns 54a, 54b and the human body may be configured to be conductive to each other or paint may be applied to the pen body 30 to enable the operation by the junction capacitance without conduction therebetween.

Figure 6:
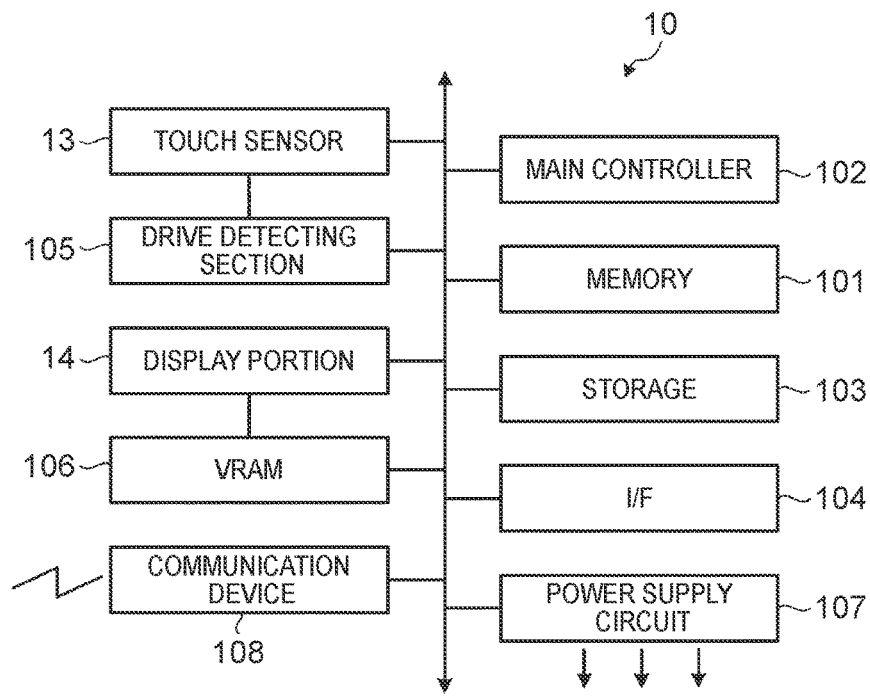
FIG. 6 is a diagram showing a schematic hardware configuration example of the tablet computer.

FIG. 6 is a diagram showing a schematic hardware configuration given by way of example of a possible configuration of the tablet computer 10. As shown in FIG. 6, the tablet computer 10 includes a main controller 102, a memory 101, a storage 103, an OF 104, the touch sensor 13, the drive detecting section 105, the display portion 14, a VRAM 106, a power supply circuit 107, a communication device 108, and so on and the respective components are directly or indirectly connected to each other via a bus.

The main controller 102 controls the entire tablet computer 10 based on a program stored in the storage 103. For example, the main controller 102 stores display information in the VRAM 106 and controls the display portion 14 to display the display information stored in the VRAM 106. Further, the main controller 102 controls the operation of the touch sensor 13 via the drive detecting section 105.

The memory 101 is constituted by a cache memory or a RAM and is a writable memory which is used as a reading area for an execution program of the main controller 102 and as a work area in which processing data of the execution program is written.

The storage 103 can be constituted by, for example, a nonvolatile memory such as an SSD and has a function to store a program to be executed by the main controller 102.

The VRAM 106 is one example of a bit map memory for storing display information. The display portion 14 is formed by, for example, an LCD or an organic EL display and displays the display information written in the VRAM 106. The I/F 104 is a wired/wireless interface for connecting a USB device or a Bluetooth (registered trademark) device.

The communication device 108 is for performing data transmission and reception via a network under the control of the main controller 102.

The power supply circuit 107 includes an AC adapter, an intelligent battery, a battery charger for charging the intelligent battery, a DC/DC converter, and so on and supplies power to the respective components under the control of the main controller 102.

The touch sensor 13 is a user interface for a user to perform input operations, for example, to perform input operations by selecting screen objects such as various menus, icons, buttons, and a keyboard displayed on a screen of the display portion 14, to perform text input operations, and to perform screen operations such as scrolling and swiping. The touch sensor 13 includes a plurality of transparent X electrodes $X_1, X_2, \ldots, X_n$ and a plurality of transparent Y electrodes $Y_1, Y_2, \ldots, Y_n$, that each may be made of Indium Tin Oxide, arranged in X and Y directions in a matrix.

The drive detecting section 105 in depicted embodiments includes a drive circuit for driving the touch sensor 13 and a detection circuit for detecting a touch position and controls the operation of the touch sensor 13 under the control of the main controller 102. The drive detecting section 105 sends a drive signal to the X electrodes $X_1, X_2, \ldots, X_n$ and the Y electrodes $Y_1, Y_2, \ldots, Y_n$ of the touch sensor 13 and detects outputs of the X electrodes $X_1, X_2, \ldots, X_n$ and the Y electrodes $Y_1, Y_2, \ldots, Y_n$, thereby distinguishing between a touch of the active pen tip 40 and a passive touch (a touch of the finger, the conductive patterns 54a, 54b, or the like) and outputting, along with a distinguishing signal, coordinate positions (X, Y) of the touched X and Y electrodes to the main controller 102.

For example, when a touch of the active pen tip 40 is detected, the drive detecting section 105 outputs a signal indicating a pen input mode and coordinate positions (X, Y) of the touched X and Y electrodes to the main controller 102. On the other hand, when a passive touch (a touch of the finger, the conductive patterns 54a, 54b, or the like) is detected, the drive detecting section 105 outputs a signal indicating a passive mode and coordinate positions (X, Y) of the touched X and Y electrodes to the main controller 102.

For example, in the case of the active pen tip, it is possible to determine that the active pen is touched, by detecting a change in an AC electric field at a predetermined frequency generated by the pen tip 40 of the touch pen 20 (capacitance fixed, applied voltage changed). On the other hand, a passive touch (a touch of the finger, the conductive patterns 54a, 54b, or the like) can be determined to be a passive touch by detecting a change in capacitance (capacitance changed, applied voltage unchanged).

The main controller 102 implements a pen input mode, a finger input mode, and an erase mode (erase function). When a signal indicating the passive mode and detected coordinate positions (X, Y) are input from the drive detecting section 105, the main controller 102 determines whether or not the detected coordinate positions (X, Y) correspond to the two conductive patterns 54a, 54b spaced apart from each other by the predetermined distance L. If the detected coordinate positions (X, Y) do not correspond to the two conductive patterns 54a, 54b spaced apart from each other by the predetermined distance L, the main controller 102 implements the finger input mode, while if the detected coordinate positions (X, Y) correspond to the two conductive patterns 54a, 54b spaced apart from each other by the predetermined distance L, the main controller 102 implements the erase mode.

In the pen input mode, the main controller 102 writes display information in the VRAM 106 according to coordinate positions (X, Y) detected by the drive detecting section 105, i.e. according to the locus of the pen tip 40, so that the display information is displayed on the display portion 14. For example, it may be configured that when the pen tip 40 is touched on the touch sensor 13, the main controller 102 displays a cursor and, when the pen tip 40 is depressed by the touch sensor 13, the main controller 102 starts writing (drawing).

In the erase mode, the main controller 102 erases, in display information written in the VRAM 106, data according to coordinate positions (X, Y) detected by the drive detecting section 105, i.e. data on the locus of the end face 53 of the pen rear end portion 50. By touching the end face 53 of the pen rear end portion 50 on the touch sensor 13 and tracing written information displayed on the touch panel 12, a user can erase the written information.

Figure 7:
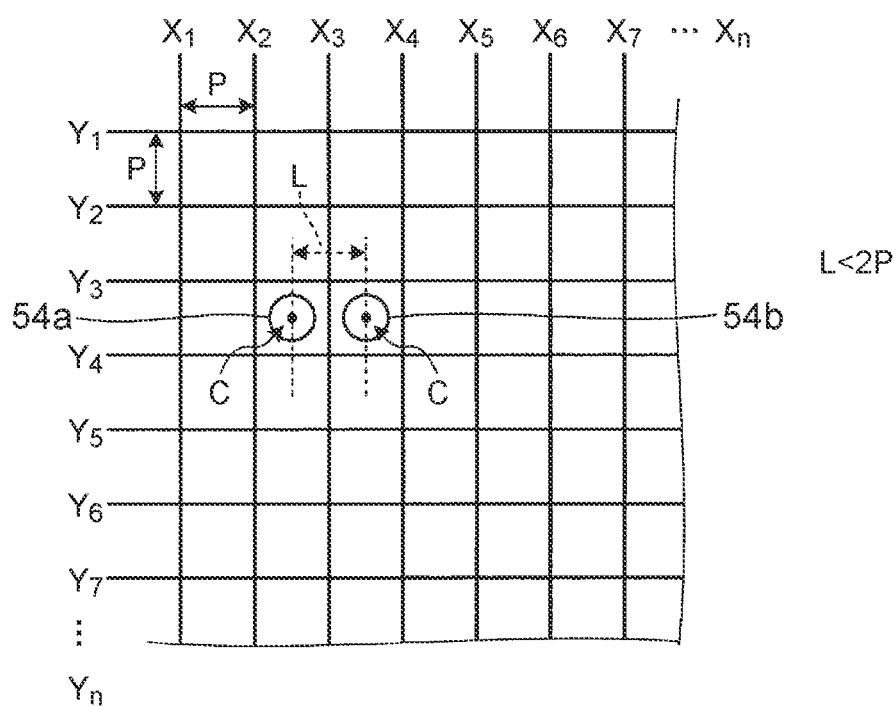
FIG. 7 is a diagram illustrating the relationship between intervals, between X electrodes and between Y electrodes, and a distance L between two conductive patterns.
Figure 8:
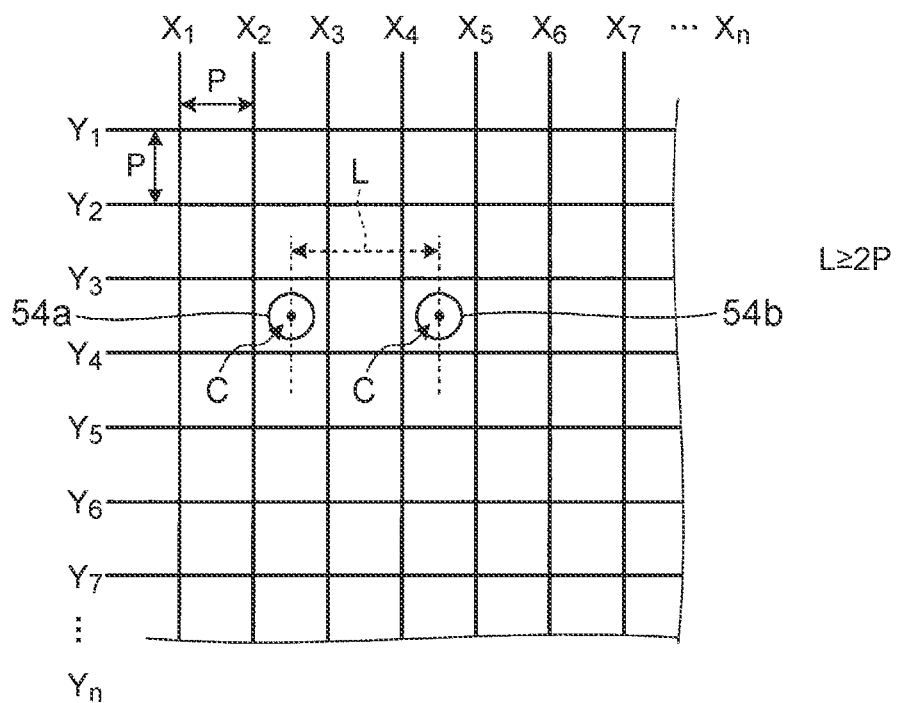
FIG. 8 is a diagram illustrating the relationship between intervals, between X electrodes and between Y electrodes, and a distance L between two conductive patterns.

Next, referring to FIGS. 7 and 8, a description will be given of the distance L (see FIG. 4) between the conductive patterns 54a, 54b of the pen rear end portion 50 of the touch pen 20. FIGS. 7 and 8 are diagrams each for explaining the relationship between intervals, between the X electrodes and between the Y electrodes, and the distance L between the two conductive patterns 54a, 54b. In FIGS. 7 and 8, the interval between the X electrodes $X_1, X_2, \ldots, X_n$ and the interval between the Y electrodes $Y_1, Y_2, \ldots, Y_n$ are each set to P. FIG. 7 shows a case where the distance L between the two conductive patterns 54a, 54b is set to L<2P. FIG. 8 shows a case where the distance L between the two conductive patterns 54a, 54b is set to L≥2P.

As the distance L between the two conductive patterns 54a, 54b increases, the conductive patterns 54a, 54b can be detected more accurately as two patterns by the touch sensor 13. Therefore, the distance L is preferably set to be large. On the other hand, there is a limit to the magnitude of the distance L in terms of the thickness of the pen rear end portion 50 of the touch pen 20.

In FIG. 7, assuming that the distance L between the two conductive patterns 54a, 54b is set to L<2P, there is a possibility that the conductive patterns 54a, 54b cannot be detected as two patterns. For example, at the X electrode $X_3$, since the conductive patterns 54a, 54b are detected in such a way that both patterns are superimposed on top of the other, there are cases where the two patterns cannot be detected (e.g. not distinguishable from a touch of the finger).

On the other hand, in FIG. 8, assuming that the distance L between the two conductive patterns 54a, 54b is set to for example, at the X electrodes $X_2, X_3, X_4, X_5$, the conductive patterns 54a, 54b are not detected in such a way that both patterns are superimposed on top of the other, and therefore the two patterns can be detected. Accordingly, it is preferable that the distance L between the two conductive patterns 54a, 54b be set to L≥2P.

[Modification 1]

Figure 9:
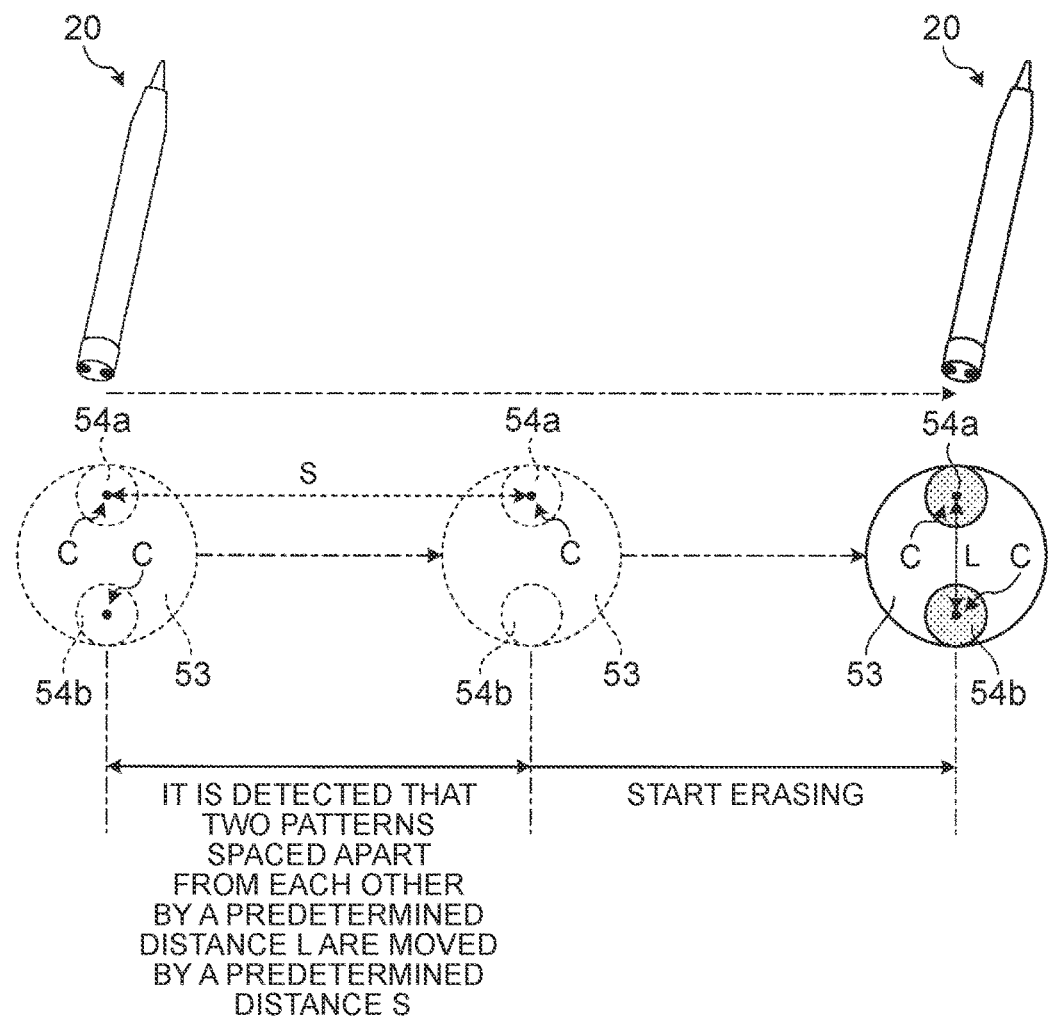
FIG. 9 is a diagram illustrating a modification of the touch pen system.

FIG. 9 is a diagram for explaining a modification of the touch pen system 1. It may be configured that the main controller 102 starts erasing when it is detected that two patterns are moved by a predetermined distance S on the touch sensor 13 while maintaining the distance L between the two patterns. With this configuration, it is possible to prevent that the mode is shifted to the erase mode when two conductors with the distance L therebetween are touched on the touch sensor 13 against the intention of a user, and thus it is possible to improve the accuracy for shifting to the erase mode.

[Modification 2]

Figure 10:
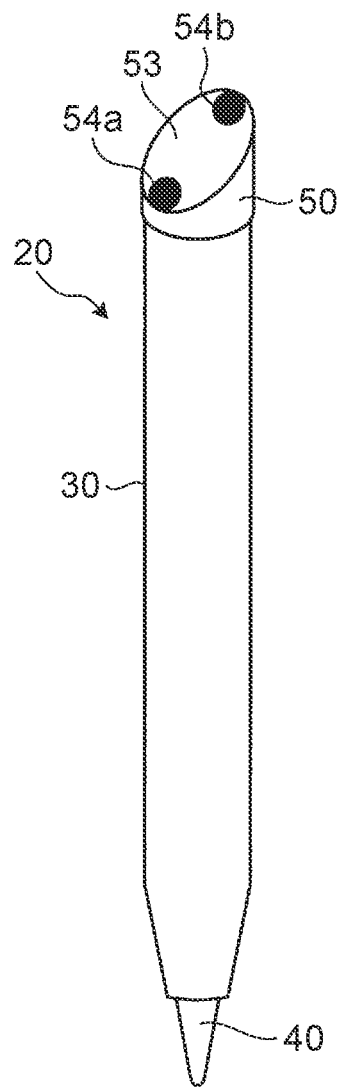
FIG. 10 is a diagram illustrating a modification of the touch pen.

FIG. 10 is a diagram for explaining a modification of the touch pen 20. As the distance L between the two conductive patterns 54a, 54b increases, the conductive patterns 54a, 54b can be detected more accurately as two patterns by the touch sensor 13. Therefore, for example, as shown in FIG. 10, the end face 53 of the pen rear end portion 50 of the touch pen 20 may be formed as an inclined surface. With this configuration, it is possible to increase the distance L without increasing the thickness of the pen rear end portion 50.

[Modification 3]

Figure 11:
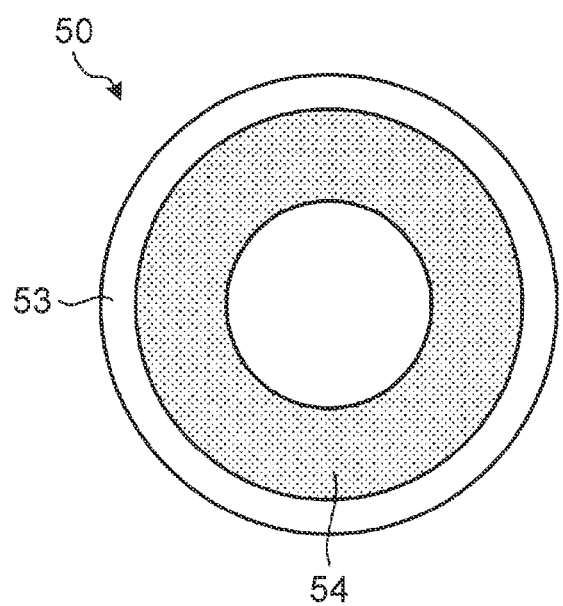
FIG. 11 is a diagram illustrating a modification of the touch pen.
Figure 12:
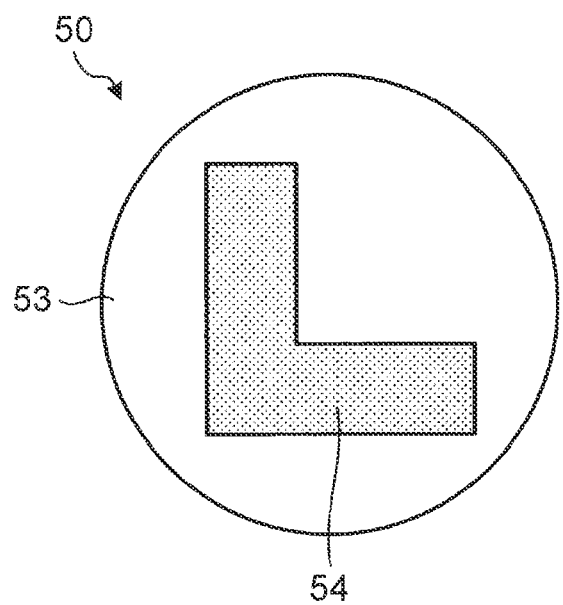
FIG. 12 is a diagram illustrating a modification of the touch pen.

FIGS. 11 and 12 are diagrams each for explaining a modification of the touch pen 20. A conductive pattern formed on the end face 53 of the pen rear end portion 50 of the touch pen 20 is not limited to the two conductive patterns 54a, 54b shown in FIG. 4 and so on. For example, it may be a conductive pattern of another shape or the number of conductive patterns to be formed may be three or more. For example, as shown in FIG. 11, it may be a doughnut-shaped conductive pattern 54. Alternatively, as shown in FIG. 12, it may be an L-shaped conductive pattern 54.

As described above, the touch pen system 1 of this embodiment includes the capacitive touch panel 12, the touch pen 20 having the pen tip 40 for specifying an arbitrary position on the touch panel 12 and the pen rear end portion 50 formed with the predetermined conductive pattern, and the drive detecting section 105 and the main controller 102 configured to implement the erase function when contact of the predetermined conductive pattern with the touch panel 12 occurs and the predetermined conductive pattern is detected. Therefore, it is possible to provide the touch pen with the compact and low-cost configuration when the erase function is installed therein.

According to one embodiment, the predetermined conductive pattern is the plurality of conductive patterns 54a, 54b spaced apart from each other by the predetermined distance. Therefore, it is possible to detect the predetermined conductive pattern with high accuracy.

According to one embodiment, assuming that the distance between the conductive patterns 54a, 54b is the predetermined distance L and that the interval between the electrodes of the touch panel 12 is P, the predetermined distance is L≥2P. Therefore, it is possible to detect the predetermined conductive pattern more accurately.

According to one embodiment, the pen rear end portion 50 has the inclined end face 53 and the conductive patterns 54a, 54b are formed on the inclined end face 53. Therefore, it is possible to increase the distance L between the conductive patterns 54a, 54b without increasing the thickness of the pen rear end portion 50.

According to one embodiment, the main controller 102 implements the erase function when it is detected that the plurality of conductive patterns are moved by the predetermined distance S while maintaining the predetermined distance L therebetween. Therefore, it is possible to prevent the erase function from being implemented against the intention of a user.

While the pen input (the pen tip 40) is of the active type in some embodiments, the passive type may alternatively be used in other embodiments.

What is claimed is:

1. A system comprising:
    a capacitive touch panel;
    a touch pen having a pen tip for specifying an arbitrary position on the touch panel and a pen rear end portion emanating a predetermined conductive pattern comprising a plurality of conductive patterns with corresponding centers spaced apart from each another, wherein the plurality of conductive patterns is disposed in the pen rear end portion forming a planar face;
    a predetermined pattern detection mechanism that detects contact of the predetermined conductive pattern with the touch panel; and
    an erase function implementation mechanism that implements an erase function responsive to detection of the predetermined conductive pattern, detection of the predetermined conductive pattern moving a predetermined travel distance, and detection that the predetermined conductive pattern has not changed over the predetermined travel distance.

2. The system of claim 1, wherein the corresponding centers of the plurality of conductive patterns are spaced apart from each other by a predetermined distance.

3. The system of claim 2, wherein, assuming that the predetermined distance is L and that an interval between electrodes of the touch panel is P, the predetermined distance L≥2P.

4. The system of claim 1, wherein the pen rear end portion has an inclined end face and the predetermined conductive pattern is formed on the inclined end face.

5. The system of claim 2, wherein the erase function implementation mechanism implements the erase function when it is detected that the plurality of conductive patterns has moved by the predetermined travel distance while maintaining the predetermined distance between the plurality of conductive patterns.

6. The system of claim 1, wherein the pen tip is an active pen tip.

7. The system of claim 1, wherein the pen tip is a passive pen tip.

8. An apparatus comprising:
a capacitive touch panel;
a predetermined pattern detection mechanism that detects contact with the touch panel of a predetermined conductive pattern emanating from a touch pen having a pen tip for specifying an arbitrary position on the touch panel, wherein the predetermined conductive pattern comprises a plurality of conductive patterns with corresponding centers spaces apart from each another, wherein the plurality of conductive patterns is disposed in the pen rear end portion forming a planar face; and
an erase function implementation mechanism that implements an erase function responsive to detection of the predetermined conductive pattern, detection of the predetermined conductive pattern moving a predetermined distance, and detection that the predetermined conductive pattern has not changed over the predetermined distance.

9. The apparatus of claim 8, wherein the corresponding centers of the plurality of conductive patterns are spaced apart from each other by a predetermined distance.

10. The apparatus of claim 9, wherein, assuming that the predetermined distance is L and that an interval between electrodes of the touch panel is P, the predetermined distance L≥2P.

11. The apparatus of claim 8, wherein the predetermined pattern emanates from an active pen.

12. The apparatus of claim 8, wherein the predetermined pattern emanates from a passive pen.

13. A method comprising:
providing a capacitive touch panel;
providing a touch pen having a pen tip for specifying an arbitrary position on the touch panel and a pen rear end portion emanating a predetermined conductive pattern comprising a plurality of conductive patterns with corresponding centers spaced apart from each another, wherein the plurality of conductive patterns is disposed in the pen rear end portion forming a planar face;
detecting contact of the predetermined conductive pattern with the touch panel; and
implementing an erase function responsive to detection of the predetermined conductive pattern, detection of the predetermined conductive pattern moving a predetermined distance, and detection that the predetermined conductive pattern has not changed over the predetermined distance.

14. The method of claim 13, wherein the predetermined conductive pattern comprises a plurality of non-concentric circular conductive patterns.

15. The method of claim 13, wherein the corresponding centers of the plurality of conductive patterns are spaced apart from each other by a predetermined distance.

16. The method of claim 13, wherein, assuming that the predetermined distance is L and that an interval between electrodes of the touch panel is P, the predetermined distance L≥2P.

17. The method of claim 13, wherein the pen rear end portion has an inclined end face and the predetermined conductive pattern is formed on the inclined end face.

18. The method of claim 13, further comprising implementing the erase function when responsive to detecting that the plurality of conductive patterns has moved by the predetermined travel distance while maintaining the predetermined distance between the plurality of conductive patterns.

19. The method of claim 13, wherein the pen tip is an active pen tip.

20. The method of claim 13, wherein the pen tip is a passive pen tip.

* * * * *